July 18, 1950 — R. SATO — 2,515,802
SHAPE SUPPORTER FOR SOFT COLLARS
Filed Nov. 13, 1947
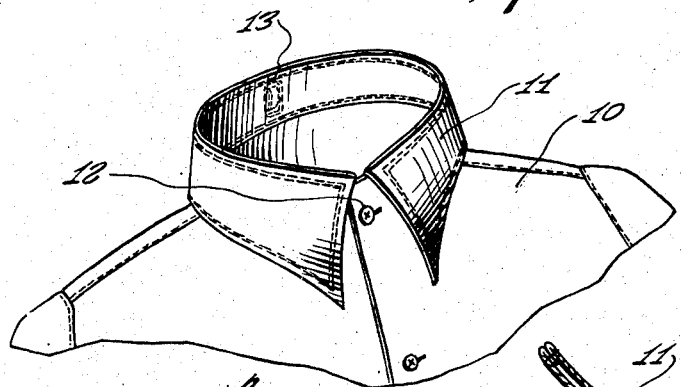
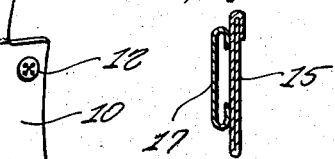
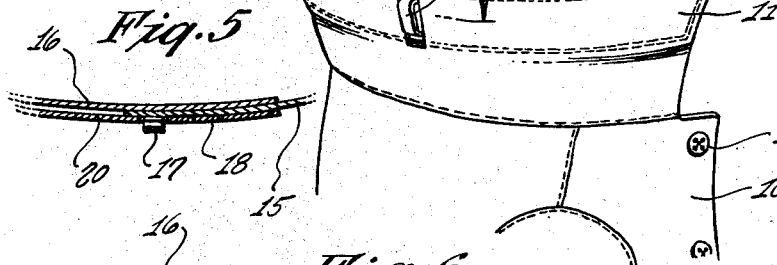
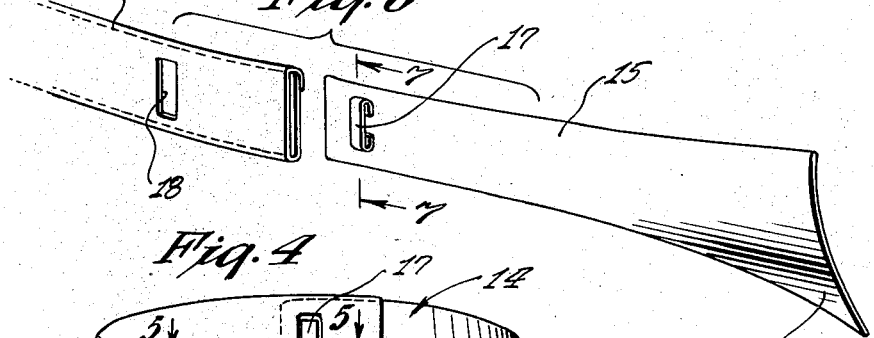
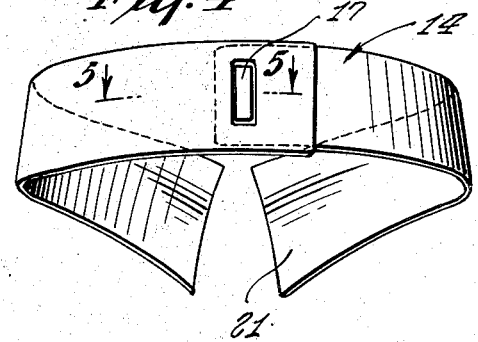
INVENTOR.
RYUJI SATO
BY Carl Miller
ATTORNEY Patented July 18, 1950

2,515,802

UNITED STATES PATENT OFFICE 2,515,802

SHAPE SUPPORTER FOR SOFT COLLARS

Ryuji Sato, New York, N. Y.

Application November 13, 1947, Serial No. 785,570

1 Claim. (Cl. 2—132)

This invention relates to a soft collar shapener which can be adapted for extension into the soft collar of shirts to shape the collar and support the same and to eliminate the necessity for having to starch the collar.

Other objects of the present invention are to provide a soft collar shapener which is of simple construction, adjustable, inexpensive to manufacture, and efficient in operation.

For a better understanding of the invention, reference may be had to the following detailed description taken in connection with the accompanying drawing, in which Fig. 1 is a perspective view looking upon the front of a collar of a shirt containing the shapener of the present invention, Fig. 2 is a rear view of the collar of the shirt extended upwardly to show the slot through which the shapener is extended into the collar, Fig. 3 is a fragmentary sectional view taken through the collar and on line 3—3 of Fig. 2, Fig. 4 is a rear perspective view of the shapener removed from the collar, Fig. 5 is a sectional view taken through the connection of the separable shapener parts, the view being on line 5—5 of Fig. 4, Fig. 6 is a collective and perspective view of the shapener parts separated from one another, Fig. 7 is a sectional view taken through one of the shapener parts and on line 7—7 of Fig. 6.

Referring now to the figures, 10 represents a shirt of the usual flexible material having a soft collar 11, the ends of which are held together about the neck of the user by a top button 12. The back of the collar has a slot or opening 13 through which my collar shapener 14 is extended into the collar to serve as a support for the collar throughout its entire length. Access is had to the opening 13 only when the collar is turned upwardly as viewed in Figure 2. When the collar is turned down the opening 13 will be hidden under the outer part of the collar.

The collar shapener 14 comprises separable shapener parts 15 and 16 which may have a telescoping connection with one another. The part 15 has a loop 17 on its inner end adapted to retain the parts in their positions. The loop 17 will project through one opening 18 of the part 16 and will keep the parts from separating from one another. The outer ends of the parts 15 and 16 are pointed as indicated at 21 to fit into the pointed front ends of the collar. The shapener parts are formed of a semi-rigid material and can be flexed slightly to permit the insertion of the parts through the opening 13. Once the shapener has been inserted the collar can be folded down from the position shown in Figure 2 to the position shown in Figure 1. The shapener parts preferably have two layers of material which are stitched together.

The shapener may be removed at times when the shirt is to be laundered. It will be apparent that there will be no necessity for having to starch the collar and that only the usual ironing operation will be necessary inasmuch as the shapening of the collar is provided with my collar shapener. Said loop 17 upon extending through the opening of the part 16 will also extend through the opening 13 of the soft collar and will prevent upon engagement with the sides of the opening 13 shifting movement of the shapener within the collar.

While various changes may be made in the detail construction, it shall be understood that such changes shall be within the spirit and scope of the present invention as defined by the appended claim.

Having now described my invention, I claim:

In a combination, a shirt having a collar, said collar being adapted to be folded upwardly and having a central opening in the back thereof through which a shapener can be extended, and a collar shapener comprising separable parts within the collar, one of said collar shapener parts being of sleeve formation and having an opening and the other part being adapted to slide fit into the one part and having a projection adapted to extend through the opening of the one shapener part and the opening of the collar when the shapener parts are within the collar whereby to retain the shapener parts against relative adjustment with respect to each other and the shapener against shifting movement within the collar.

RYUJI SATO.

REFERENCES CITED

The following references are of record in the file of this patent:

UNITED STATES PATENTS

| Number | Name | Date |
|---|---|---|
| 582,223 | Pearson | May 11, 1897 |
| 1,316,882 | Euth | Sept. 23, 1919 |
| 1,916,794 | Haven | July 4, 1933 |

FOREIGN PATENTS

| Number | Country | Date |
|---|---|---|
| 327,800 | Germany | Oct. 18, 1920 |